US007831612B2

(12) United States Patent
Le et al.

(10) Patent No.: US 7,831,612 B2
(45) Date of Patent: Nov. 9, 2010

(54) APPARATUS AND METHOD FOR GENERATING REPORTS FROM SHARED OBJECTS

(75) Inventors: Weiliang Le, Coquitlam (CA); Ju Wu, Coquitlam (CA); Philipp Ziegler, Levallois-Perret (FR); David Manuel Weisbeck, Vancouver (CA); Blair Thomas Wheadon, North Vancouver (CA)

(73) Assignee: Business Objects Software Ltd., Dublin (IE)

( * ) Notice: Subject to any disclaimer, the term of this patent is extended or adjusted under 35 U.S.C. 154(b) by 199 days.

(21) Appl. No.: 10/954,641

(22) Filed: Sep. 29, 2004

(65) Prior Publication Data

US 2006/0069628 A1    Mar. 30, 2006

(51) Int. Cl.
*G06F 17/30* (2006.01)
(52) U.S. Cl. .................................. 707/775; 715/825
(58) Field of Classification Search .................. 707/1, 707/3, 7, 10, 104.1, 775; 715/500
See application file for complete search history.

(56) References Cited

U.S. PATENT DOCUMENTS

| | | | | |
|---|---|---|---|---|
| 4,879,648 A | * | 11/1989 | Cochran et al. | 715/841 |
| 5,206,949 A | * | 4/1993 | Cochran et al. | 707/4 |
| 5,455,945 A | * | 10/1995 | VanderDrift | 707/2 |
| 6,085,193 A | * | 7/2000 | Malkin et al. | 707/10 |
| 6,105,027 A | * | 8/2000 | Schneider et al. | 707/9 |
| 6,154,766 A | * | 11/2000 | Yost et al. | 709/201 |
| 6,236,400 B1 | * | 5/2001 | Guerrero | 715/841 |
| 6,253,195 B1 | * | 6/2001 | Hudis et al. | 707/2 |
| 6,609,123 B1 | * | 8/2003 | Cazemier et al. | 707/4 |
| 6,611,838 B1 | * | 8/2003 | Ignat et al. | 707/101 |
| 6,748,376 B1 | * | 6/2004 | Beall et al. | 707/3 |
| 6,799,174 B2 | * | 9/2004 | Chipman et al. | 707/3 |
| 7,013,289 B2 | * | 3/2006 | Horn et al. | 705/26 |
| 7,113,933 B1 | * | 9/2006 | Imholte | 707/1 |
| 7,302,639 B1 | * | 11/2007 | Everhart et al. | 715/234 |
| 7,640,517 B2 | * | 12/2009 | Moehrle | 715/855 |
| 2001/0043238 A1 | * | 11/2001 | Guerrero | 345/853 |
| 2002/0194043 A1 | * | 12/2002 | Lidow | 705/7 |
| 2003/0182303 A1 | * | 9/2003 | Gibson | 707/102 |
| 2006/0026122 A1 | * | 2/2006 | Hurwood et al. | 707/1 |

FOREIGN PATENT DOCUMENTS

EP    947921 A2 * 10/1999

* cited by examiner

*Primary Examiner*—Hung Q Pham
*Assistant Examiner*—Hubert Cheung
(74) *Attorney, Agent, or Firm*—Cooley LLP (57) ABSTRACT

The invention includes a computer readable medium with executable instructions to generate a report. The executable instructions include executable instructions to supply a prompt group corresponding to a cascading prompt. A list of values is accessed to identify values to be supplied to the prompt group. Prompt presentation values are selected in accordance with access restrictions for a specified user. Parameters are selected based upon the prompt presentation values. A report is then generated based upon the parameters. Thus, the specified user receives a personalized report in accordance with the access restrictions.

5 Claims, 7 Drawing Sheets

APPARATUS AND METHOD FOR GENERATING REPORTS FROM SHARED OBJECTS

BRIEF DESCRIPTION OF THE INVENTION

This invention relates generally to the generation of reports in a computer network. More particularly, this invention relates to a technique for generating reports from shared objects.

BACKGROUND OF THE INVENTION

The term report refers to structured information generated from a data source, such as a database. Typically, the report represents a small sub-set of the data available in the data source and is generated in response to user queries. Conventional report-based prompts are designed to solicit input from users at runtime, thus making it possible for a reporting system to effectively establish the information to be displayed in a report.

Figure 1:
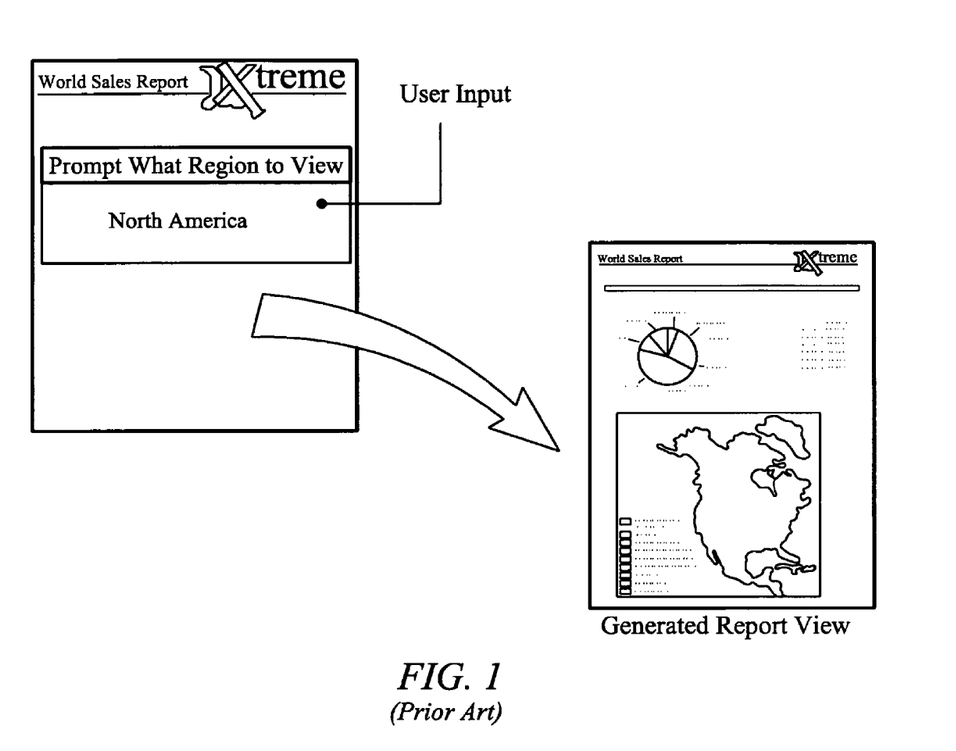
FIG. 1 illustrates a prior art report-based prompt technique.

FIG. 1 illustrates an exemplary prior art world sales report where a user is asked to specify the region for which sales data should be presented. In this context, a report prompt can be considered a type of rudimentary data filter that is applied by the end user at runtime.

Figure 2:
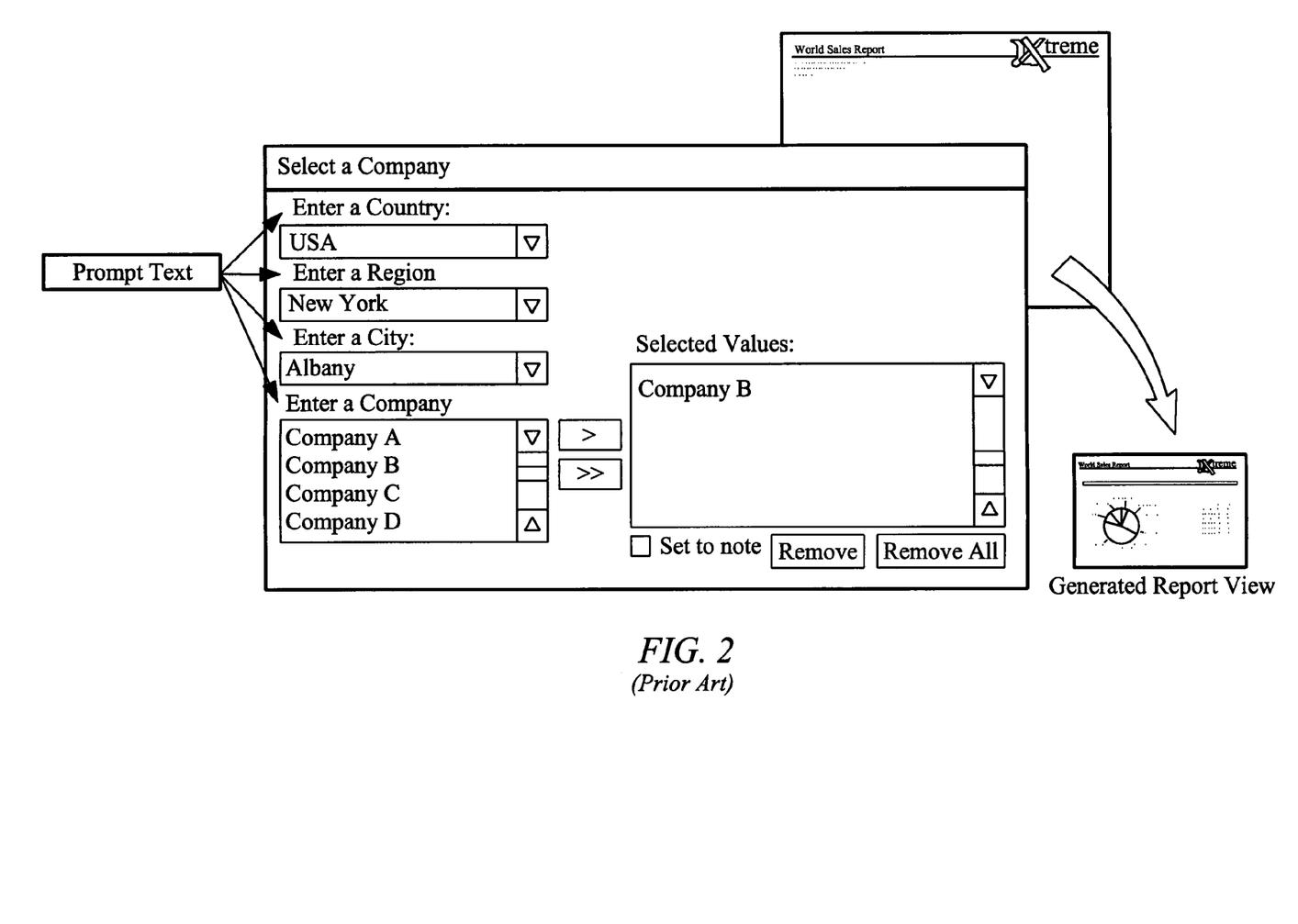
FIG. 2 illustrates a prior art cascading prompt technique.

A cascading prompt makes it possible for report designers to further establish a logical prompt navigation that can be applied as a more granular filter. That is, the cascading prompt presents the user with a hierarchical prompt control in which a top-level selection constrains a lower level of prompt controls, continuing in a cascading series. This operation is illustrated in FIG. 2 where an end user is presented with a sales report designed to display the sales data for any specified company in a global conglomerate. The only required parameter is a company name. To make it easier for users to navigate to a specific company's data, a cascading prompt is set-up to obtain a set of parameters, in this case a country, then a region, then a city, and finally a company name.

Cascading prompt technology of this type exists in current reporting technologies. Essentially, the technology makes it easier for users to identify the information they need in cases where the value of a required report parameter is derived from a list of values that is too extensive to navigate as a flat entity.

Unfortunately, there are a number of problems with this approach. First, the performance associated with this approach is sub-optimal since each time a report is generated it is necessary to access a current list of values associated with the cascading prompts. This results in a large volume of traffic at the database, which diminishes performance. In addition, this approach is not scalable. That is, since the source data repository forms a bottleneck to performance, existing cascading prompt techniques do not scale well.

In view of the foregoing, it would be highly desirable to provide an improved technique for generating reports from cascading prompts. In particular, it would be highly desirable to provide a technique with improved performance and scalability.

SUMMARY OF THE INVENTION

The invention includes a computer readable medium with executable instructions to generate a report. The executable instructions include executable instructions to supply a prompt group corresponding to a cascading prompt. A list of values is accessed to identify values to be supplied to the prompt group. Prompt presentation values are selected in accordance with access restrictions for a specified user. Parameters are selected based upon the prompt presentation values. A report is then generated based upon the parameters. Thus, the specified user receives a personalized report in accordance with the access restrictions.

The invention also includes a computer readable medium with executable instructions to define a list of values data source to produce a list of values object with update attributes specifying a schedule to update values associated with the list of values object. A prompt engine creates a cascading prompt to facilitate the receipt of user specified values based upon the list of values. A report is produced based upon the user specified values.

Those skilled in the art will recognize a number of benefits associated with the present invention. First, an entire prompt definition can be defined once and saved to a shared repository for reuse. The prompt definition may include both the data source and the prompt format information. Because it is common for the same prompts to be used in many reports, this innovation allows for prompt format and data source bindings to be defined once and shared by multiple report designers. The prompt definition includes a data source-binding component called a list of values data source, which defines the data that is to form the cascading relationship. When a list of values data source is executed, it creates a corresponding list of values object. Because a list of values data source is a standalone entity, without dependencies on other objects, it has a number of advantages. For example, the list of values data source can be shared at execution time, it can be reused during design time, and it can be scheduled for periodic updates. In one embodiment of the invention, a single list of values data source has static data that is not updated, and dynamic data that is periodically updated. This embodiment is highly advantageous for large lists of values that have many static components (e.g., geographical location or corporate structure) and relatively few dynamic components (e.g., sales data). Thus, a single list of values object can combine the benefits of scheduling with real time access. The upper level of a hierarchical list of values can be scheduled, and the bottom levels can refresh their values every time the report is run. Therefore, the scheduled list of values of the invention only queries the database at periodic intervals, instead of with the execution of every report, as is the case with conventional systems. Thus, the invention results in less activity on the database. This enhances the system's responsiveness and facilitates scalability.

Another significant advantage associated with the invention is that the list of values may be used to implement personalized reports. For example, a single report can be sent to a group of managers, but the access restrictions associated with list of values assigned to each manager allows each manager to only view data relevant to each manager's operating unit. In one embodiment of the invention, an individual report recipient receives prompts that are tailored to that individual's access rights.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 3:
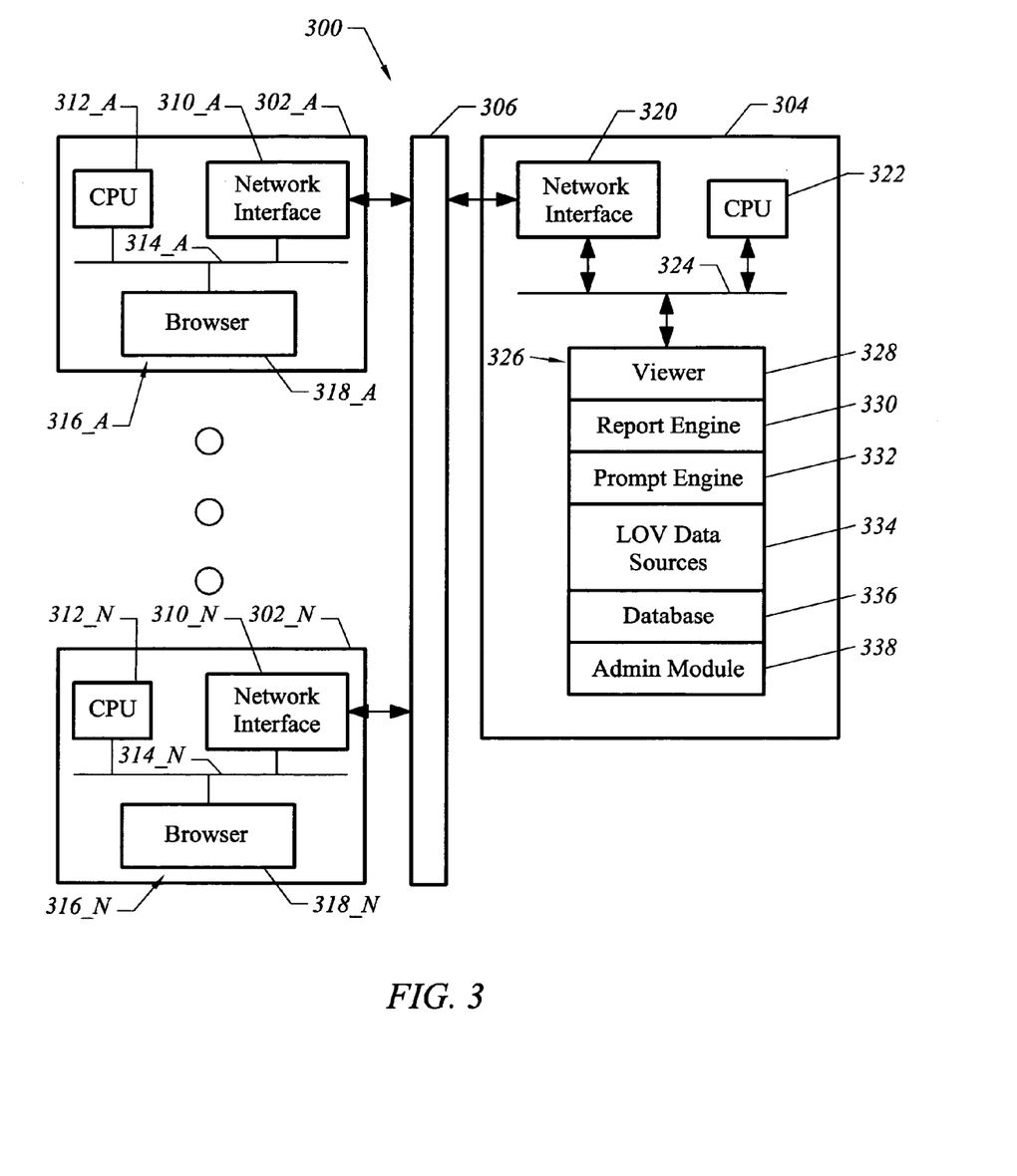
FIG. 3 illustrates a network configured in accordance with an embodiment of the invention.

FIG. 3 illustrates a network 300 configured in accordance with an embodiment of the invention. The network 300 includes a set of client computers 302_A thru 302_N, which communicate with a server computer 304 via a transmission channel 306, which may be any wired or wireless transmission channel. Each client computer 302 includes standard components, including a network interface 310 and a CPU 312, which communicate over a bus 314. A memory 316 is also connected to the bus 314. The memory stores a set of executable programs, including a browser 318.

The server 304 also includes a number of standard components, including a network interface 320 and CPU 322, which communicate via a bus 324. A memory 326 is also connected to the bus 324. The memory 326 stores a set of executable programs that are used to implement the functions of the invention. In one embodiment of the invention, the executable programs include a viewer 328, which operates as a standard interface to present report data.

The memory also stores a report engine 330, which includes a set of executable programs to generate reports. The report generation function associated with the report engine 330 is standard. However, the report engine 330 further includes executable instructions to interact with the prompt engine 332 and to generate reports from lists of values. In accordance with the invention, the report engine 330 relies upon list of value (LOV) data sources to create lists of values, which are used to produce parameters. The parameters are then processed by the report engine 330 to produce a report.

The memory 326 also stores a prompt engine 332. As will be discussed below, the prompt engine 332 includes executable instructions that generate user selection options. The selected options or answers are called parameters. As previously indicated, the parameters are processed by the report engine 330 to produce a report.

The memory 326 also stores an administrator or admin module 338. The admin module 338 includes executable instructions to solicit input from an administrator or other user regarding the frequency at which a list of values should be updated. In accordance with one embodiment of the invention, it is desirable to have portions (e.g., the higher elements in a data hierarchy) of a list of values updated infrequently while other portions (e.g., the lower elements in the data hierarchy) of the list values are updated frequently. The admin module 338 also includes executable instructions to solicit input from an administrator or other user regarding access restrictions associated with lists of values delivered to different users. The access restrictions are advantageously used to restrict the prompting information provided to an individual so that the individual only accesses data consistent with that individual's security rights.

It should be appreciated that the executable modules illustrated in memory 326 are exemplary. The functions of the invention may be implemented in any number of ways. In addition, it should be appreciated that functions of the invention need not be implemented on a single server 304. The functions of the invention may be implemented across a set of servers, clients, clients and servers, etc. It is the functions of the invention that are significant, not where or how these functions are implemented in a network.

Figure 4:
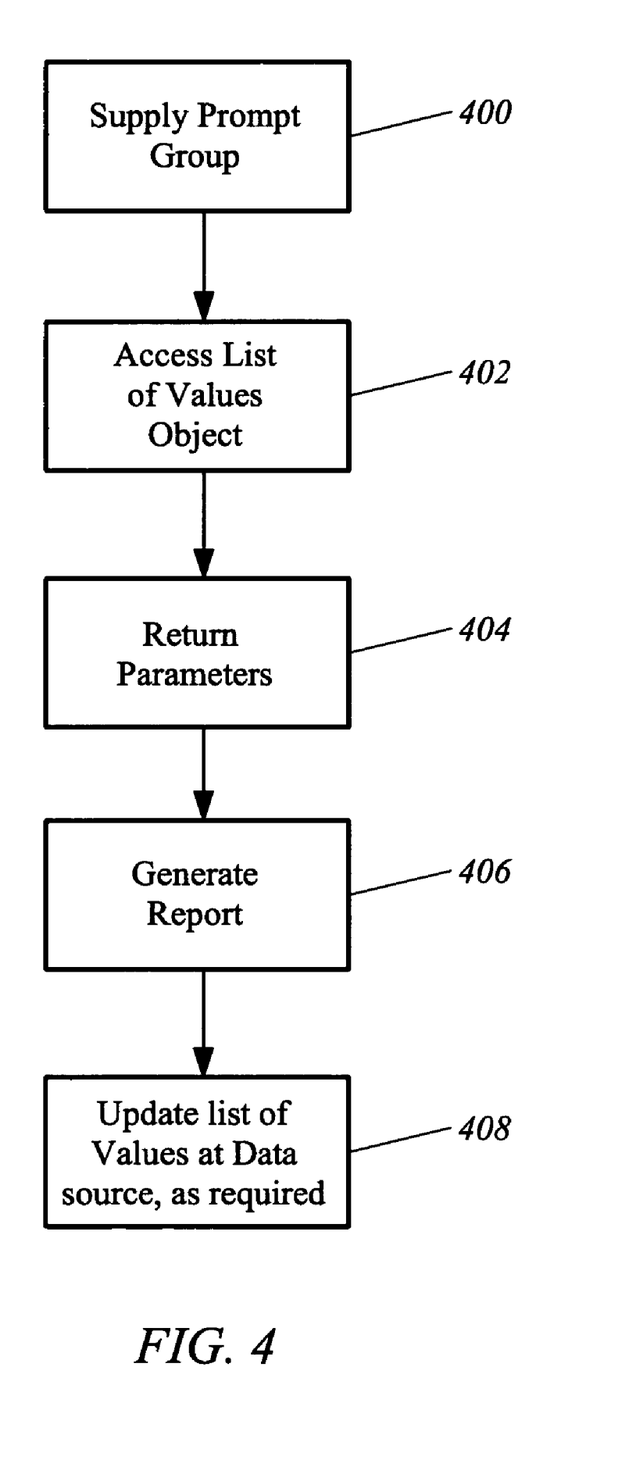
FIG. 4 illustrates processing operations associated with an embodiment of the invention.

FIG. 3 introduces an architecture to implement operations associated with the invention. FIG. 4 provides a more detailed characterization of these operations. In particular, FIG. 4 illustrates processing operations associated with an embodiment of the invention. The first operation is to supply a prompt definition (400). A prompt is essentially a question to a user. FIG. 2 illustrates a cascading prompt that requests hierarchical information. The prompt facilitates the receipt of user specified values. In accordance with the invention, a single prompt may be used by multiple reports. Consider, for example, a single prompt including cascaded values of the type shown in FIG. 2, which is used for a world sales report. The same cascaded values can be reused in reports specifying profitability, expenses, and the like. The modular nature of the prompt and other features of the invention are more fully discussed below.

The next operation shown in FIG. 4 is to access a list of values data source to generate a list of values object (402). The list of values object defines specific values associated with a prompt. The specific values that are selected based upon a prompt result in the return of parameters (404). In other words, the selection of cascading prompt values results in a set of parameters. A report is then generated based upon the set of parameters (406).

The final operation of FIG. 4 is to update the list of values at the data source, as required (408). This operation is performed in accordance with the input received from the admin module 338. For example, the admin module 338 may receive update attributes specifying a schedule to update values associated with the list of value. As previously indicated, different levels in the list of values may be updated at different intervals. Consider the following example. Suppose that a company with a chain of retail stores wants to track sales of personal computers. In this case, the list of values hierarchy may be:

```
Region
    City
        Store
            Salesman
                PC_Model
                    CustomerName
```

Using the admin module 338, an administrator can establish a number of controls associated with this list of values. For example, the system may be set to automatically refresh the list of values up to "Salesman" every few days. This means that the Region, City, and Store values are not updated by the database on this schedule. On the other hand, database accesses to the Salesman, PC_Model, and CustomerName are performed according to this schedule. This approach reduces database accesses, but also insures sufficiently new data to track the performance of new salesmen.

The foregoing example represents time-based scheduling criteria. Event-based scheduling criteria may also be used. Event-based scheduling results in the updating of at least one field of a list of values when an event alters a value in a list of values hierarchy. For example, the admin module 338 may be used to specify that the list of values is updated every time a new PC model is introduced.

The operations of the invention are more fully appreciated in connection with a more specific discussion. This discussion relies upon the following terms:

Parameter: An object that a report engine (or any other consumer) uses. In one embodiment, the object includes the values required to query, process or format data. Typically, a parameter includes a name, values and/or type properties. Parameters receive their values from prompts.

Prompt: An object that is used to help retrieve or validate the values specified by an end user for a parameter (or for filtering a list of values for another prompt). A prompt encapsulates settings that control user interface behavior.

List of values: The information that can be used to set the value of a prompt. Prompts can optionally be associated with a list of values object. A list of values contains information from a database that is used by a report generator to produce a report. In accordance with embodiments of the invention, the list of values is optionally updated in accordance with a schedule.

List of values data source: A data service that provides a list of values based on the prompting context passed in. It can be dynamic (executed when the report opens), scheduled (executed on a fixed schedule) or static (values are embedded in the report).

Prompt Group: A collection of prompts that share a cascading relationship and the same underlying list of values data source. Each prompt in a prompt group maintains its own user interface settings and bindings to portions of the same common underlying list of values data source.

Dynamic and cascading prompting: Refers to prompting where there is a combination of an implied multi-level hierarchical relationship and a dynamic list of values data source.

Figure 5:
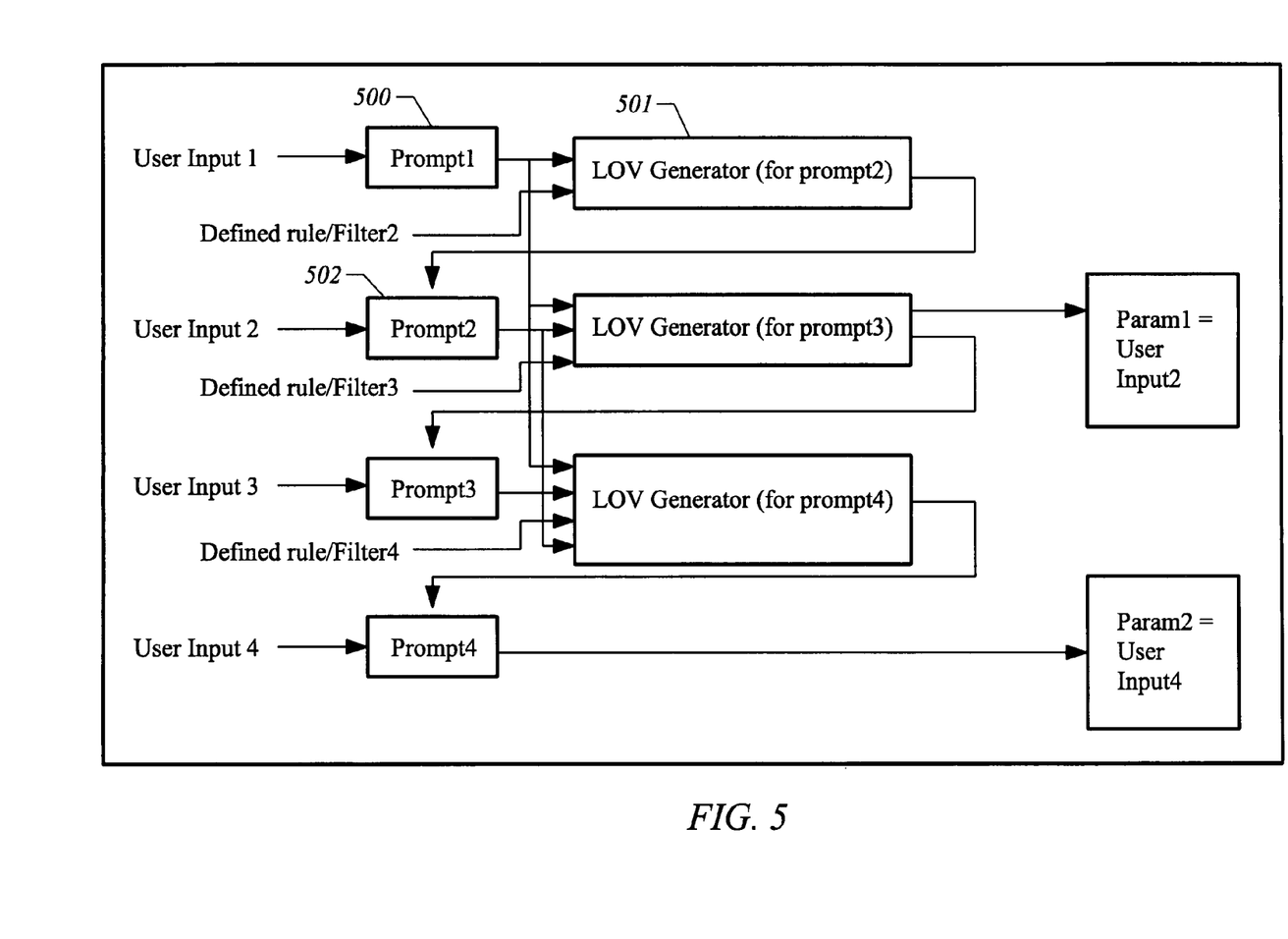
FIG. 5 illustrates a parameter prompting process in accordance with an embodiment of the invention.

These definitions are more fully appreciated with reference to FIG. 5. FIG. 5 illustrates that a first prompt 500, results in user input (User Input 1). By way of example, the first prompt 500 may be a cascading prompt of the type shown in FIG. 2. The user input received from the prompt is processed by a list of values generator 501 to produce a list of values. The list of values generator can be implemented as a portion of a list of values data source 334. As previously indicated, the list of values data source is an executable program in the form of a data service that generates a list of values corresponding to the values specified in the prompt. The list of values data source can sit on top of any data source, such as a relational database, an On-Line Analytic Processing (OLAP) database, a web service, or other data source.

The list of values data source can be personalized or reflect security settings that restrict the values shown to specific users. For example, the admin module 338 may be used to define access restrictions for a specified user. These accesses restrictions may then be associated with the list of values. Alternately, the access restrictions may be implemented as part of the security associated with a business view. A business view is a structured summary of data from different data sources. Business views and their associated access restrictions are described in the commonly owned, co-pending patent application entitled, "Apparatus and Method for Accessing Diverse Native Data Sources through a Metadata Interface", Ser. No. 10/850,355, filed May 19, 2004, the content of which is incorporated herein by reference.

As shown in FIG. 5, the list of values object may be further processed to generate values for additional levels of the same list of values object. In particular, FIG. 5 illustrates the prompting flow for a single list of values object with four levels. Each level of the list of values object has a prompt associated with it. Although each level constrains the values displayed in the next level, only two of the four values are used in this report. These are levels 2 and 4. The values displayed for Prompt 1 (501) are unconstrained by prior choices. The user selection at that level is used by list of value generator 501 to produce the values displayed for Prompt 2. Observe in this case that User Input 2 is assigned to a first parameter (Param1). This use of prior prompts to constrain the values of following (cascading) prompts can be repeated, as shown in FIG. 5. Each list of value generator 501 of FIG. 5 may be used to define a rule as to how to display a list of values. For example, the rule may specify that the values should be listed alphabetically, according to a predefined grouping, or other criteria.

Figure 6:
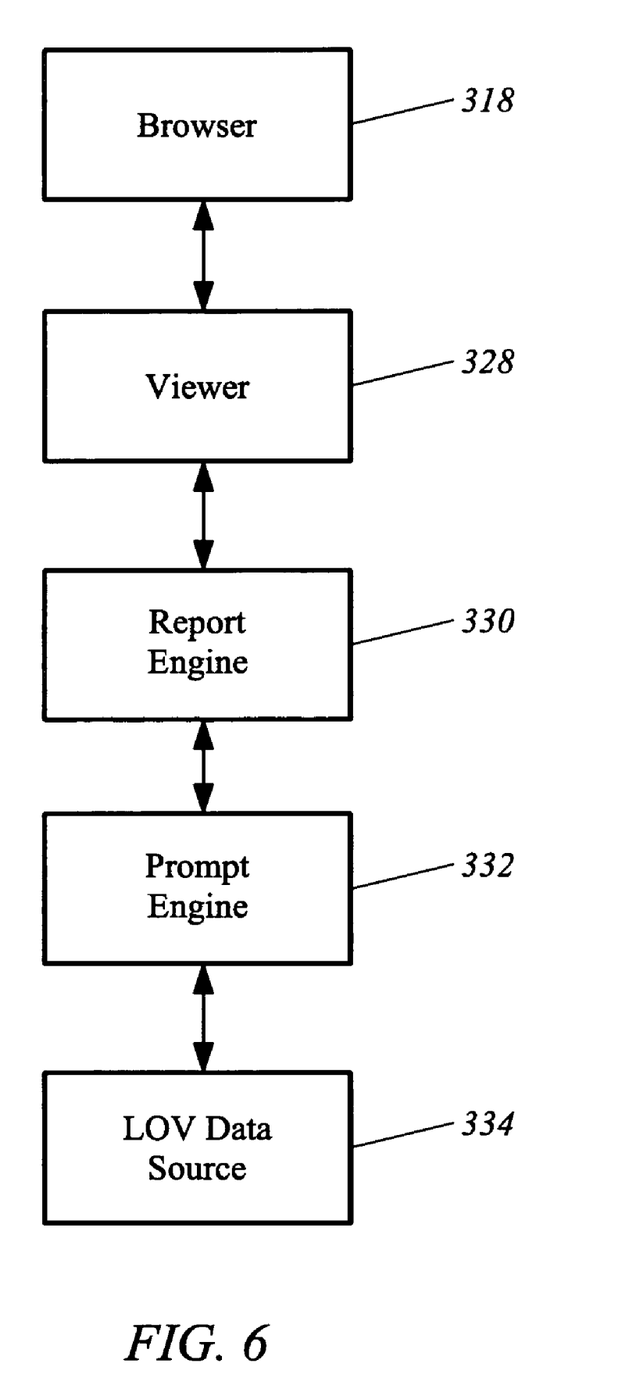
FIG. 6 illustrates the generation of reports from shared objects in accordance with an embodiment of the invention.

The operations of the invention are more fully appreciated with reference to FIG. 6. In FIG. 6 a browser 318 on a client machine 302 requests to view a report page. The viewer 328 on the server 304 requests that the report engine 330 fetches the report page. In this example, the report engine 330 determines that a parameter (or parameters) required to view the report page is missing. For example, values of a cascading prompt are not specified. The report engine 330 passes the parameters with missing values to the prompt engine 332. The prompt engine 332 analyzes the parameters with missing values, renders prompt content (e.g., HTML) for the parameters that need to be filled out, and passes the prompt content back to the report engine 330. The report engine 330 passes the prompt content back to the viewer 328, which passes it to the browser 318. At this point, the browser 318 has a more complete cascading prompt to allow completion of the report.

The user at the browser 318 fills out the prompting user interface form associated with the prompt content and sends it back to the viewer 328. The viewer 328 passes the form to the report engine 330, which passes the form to the prompt engine 332. If the prompting procedure is not finished (e.g., an incomplete cascading hierarchy or if some filled in value is not correct), the foregoing operations are repeated. If the prompting procedure is finished, then all the parameters required by the report engine have values assigned to them from their corresponding prompt, and the report engine can process the report. The report is then passed to the viewer 328, which passes the report to the browser 318.

This example illustrates the de-centralized nature of this embodiment of the invention. In the prior art, prompting logic is typically associated with a viewer. With the current invention, the prompting logic (prompt engine) resides on the server computer 304. This enables the prompting logic to be shared across viewers and consumers to facilitate scalable systems.

Figures 7, 8:
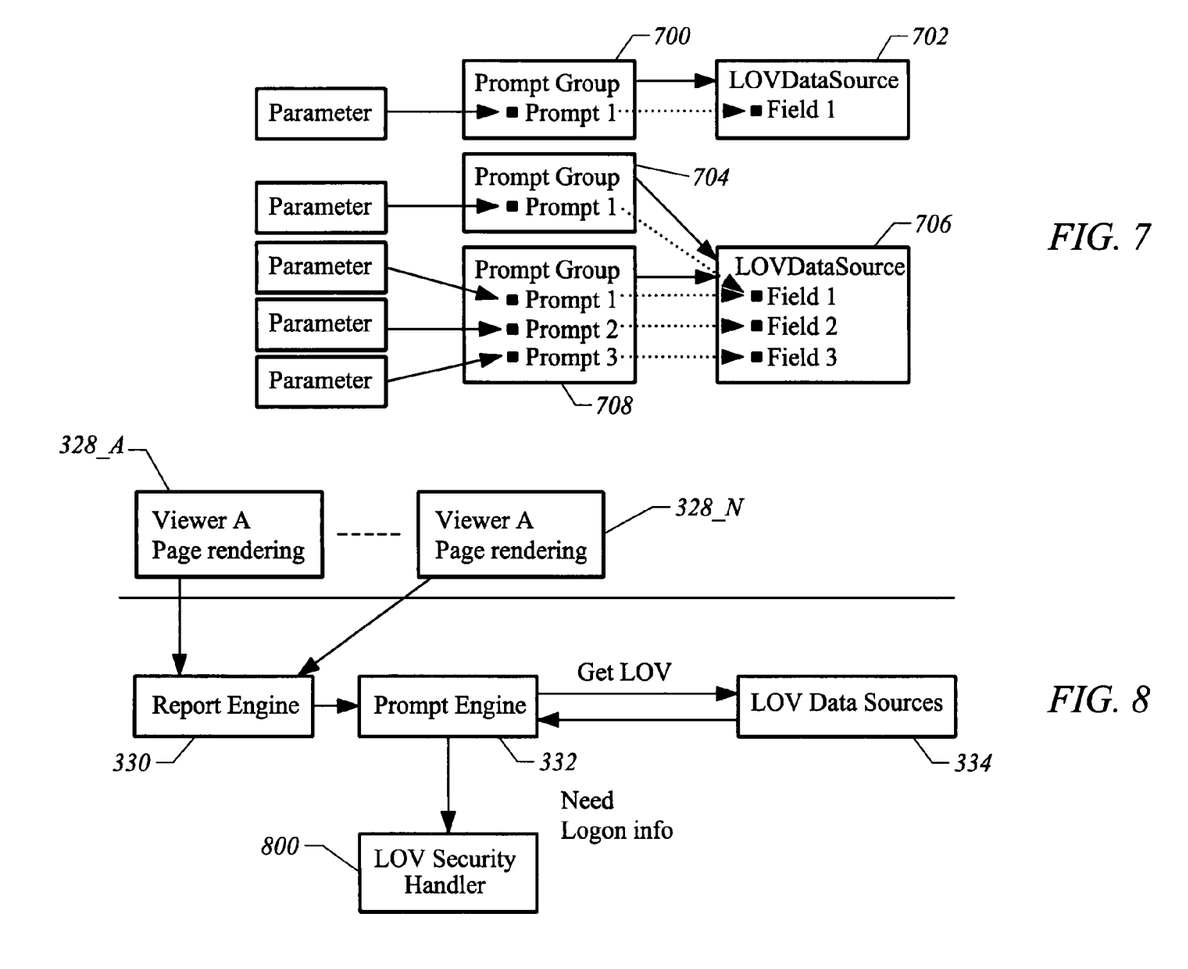
FIG. 7 illustrates parameters, prompts, and prompt groups as utilized in accordance with an embodiment of the invention.
FIG. 8 illustrates a component-based architecture implementing an embodiment of the invention.

The prompts of the invention can be represented using a user interface element that asks the user to input text, dates, discrete values, ranged values, and the like. A prompt group represents a collection of user interface elements that share the same underlying list of values data source. In FIG. 7 a first prompt group 700 includes a single prompt (Prompt 1), which maps to a field (Field 1) of a list of values data source 702. A second prompt group 704 includes a single prompt (Prompt 1), which maps to a field (Field 1) of a second list of values data source 706. A third prompt group 708 includes three prompts (Prompt 1, Prompt 2, Prompt 3), which map to three corresponding fields (Field 1, Field 2, Field 3) of the second list of values data source 706. Observe that Field 1 of data source 706 is accessed via prompts from both prompt group 704 and prompt group 708. For example, Field 1 may be an address, while prompt group 704 specifies billing address information and prompt group 708 specifies mailing address information. This illustrates the shared nature of a list of values data source. Further observe in FIG. 7 the mapping from a parameter to a prompt to a field. Thus, it can be seen that each parameter has a corresponding field in a list of values data source.

Observe the modular nature of each prompt group. An entire prompt definition can be defined once and saved to a shared repository for reuse. The prompt definition may include both the data source and the prompt format information. Because it is common for the same prompts to be used in many reports, this innovation allows for prompt format and data source bindings to be defined once and shared by multiple report designers.

A prompt group is linked to a list of values data source, which produces a list of values object. A list of values hierarchy may be implemented in many forms. In one embodiment, a list of values hierarchy includes separate value and description fields:

> CountryCode / CountryName
> RegionCode / RegionName
> CityCode / CityName

Given, for example, a three level cascading list of values, parameters can be associated with any and all levels. In this example, all parameters of all levels are considered.

> CountryCode    => {?Country}
> RegionCode     => {?Region}
> CityCode       => {?City}

In this example, only parameters at a desired level are considered.

> CountryCode
>   RegionCode
>     CityCode   => {?City}

In both cases, the user interface rendered to the report viewer is the same. The only difference is which values are used by the actual report. In the first case, all three values are used by the report. In the second case, just the city value is used by the report.

As previously discussed, the invention relies upon a modular or de-centralized architecture. This architecture is more fully appreciated with reference to FIG. 8. A variety of viewers 328_A through 328_N may be used to access a report engine 330. The report engine 330 independently analyzes a report request to identify missing parameter information. The prompt engine 332 controls prompting operations by accessing list of values data sources 334, which are used to select missing parameters.

An interface to one component (e.g., the report engine 330) should not provide visibility into another component (e.g., the prompt engine 332). Thus, report engine and prompt engine consumers should not have access to list of values data source logon information. This restricted access may be implemented with a list of values security handler 800.

In one embodiment of the invention, there are three ways the list of values data source can obtain data source logon information. In one implementation, the list of values data source knows where to get the logon information (e.g., the logon information is persisted with the list of values data source or the list of values data source has the ability to read from configuration files). In another implementation, a list of values security plug-in is used. The plug-in is designed and implemented with the list of values data source together or by the consumer and prompt engine integrator. In a third implementation, the end user is prompted to get the logon information.

This may be implemented as follows. Assume, for example, that a consumer (e.g., a request from report engine 330) asks the prompt engine 332 to retrieve a prompting user interface. The prompt engine 332 asks the list of values data source 334 to get the actual list of values. The list of values data source 334 needs logon information and throws an exception to the prompt engine 332. The prompt engine 332 fires an event to ask for required information (e.g., if any list of value security event listener is connected). The event handler 800 passes back logon information. The prompt engine 332 passes this to the list of values data source 334. If there is no security handler connected, the prompt engine 332 asks the list of values data source to get logon prompt information and render it and prompt the end user.

Other security features associated with the invention may be used to render personalized reports. As previously indicated, the admin module 338 may be used to specify database fields (parameters) that may be accessed by particular user. Thus, a user may be delivered a complete list of values with a report, but the access restrictions associated with the list of values results in the display of the appropriate fields for the specified user. Accordingly, the executed report will only include the relevant, personalized information. For example, consider a management report to track salesmen performance. The same report can be sent to five different regional managers. However, access restrictions associated with the list of values specifies that a given regional manager is only supplied with prompts listing cities in her region. This results in a personalized report based upon the cascading prompts, which are controlled by the security function of the invention.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using the JAVA programming language, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium having stored thereon executable instructions executed by a processor to generate a report, wherein said executable instructions perform the method of:
    supplying a prompt group from a shared repository used by a plurality of reports to a specified user, wherein said supplied prompt group corresponds to a cascading prompt, wherein said cascading prompt has been previously defined and stored in said shared repository;
    accessing a list of values to identify values to be supplied to said supplied prompt group, wherein said accessing said list of values includes selecting prompt presentation values for said supplied prompt group in accordance with security access restrictions for said specified user;
    supplying to said specified user a security access restricted display of prompt presentation values;
    selecting parameters based upon said supplied security access restricted display of prompt presentation values;
    generating a particular report based upon said selected parameters, wherein said specified user receives a personalized report in accordance with said security access restrictions for said specified user; and
    periodically updating existing values in said list of values, wherein said list of values includes a hierarchy of values, wherein different levels of said hierarchy of values are updated at different frequencies.

2. The computer readable storage medium of claim 1, wherein said executable instructions for periodically updating said existing values in said list of values includes executable instructions to periodically update a subset of said existing values in said list of values through access to an underlying database.

3. The computer readable storage medium of claim 1, wherein said executable instructions for periodically updating said existing values in said list of values includes executable instructions to periodically update said existing values in said list of values in accordance with a specified time schedule.

4. The computer readable storage medium of claim 1, wherein said executable instructions for periodically updating said existing values in said list of values includes executable instructions to periodically update said existing values in said list of values in accordance with a specified event schedule.

5. The computer readable storage medium of claim 1, further comprising executable instructions to use said existing values in said list of values in conjunction with an additional cascading prompt to create a new list of values.

* * * * *